United States Patent [19]
Kabrick

[11] 3,808,540
[45] Apr. 30, 1974

[54] LOUDNESS CONTROL

[75] Inventor: Wallace J. Kabrick, Plainville, Ill.

[73] Assignee: Gates Radio Company, Quincy, Ill.

[22] Filed: Mar. 11, 1971

[21] Appl. No.: 123,432

Related U.S. Application Data

[63] Continuation of Ser. No. 675,659, Oct. 16, 1967, abandoned.

[52] U.S. Cl. ............ 325/187, 179/1 VL, 333/18 R
[51] Int. Cl. ............ H04b 1/04
[58] Field of Search .......... 179/1 R, 1 D, 1 P, 1 VL, 179/1 VC, 1 SW; 333/18 R, 18 T, 28 T; 325/187; 330/31, 86, 709

[56] References Cited

UNITED STATES PATENTS

| | | | |
|---|---|---|---|
| 2,312,260 | 2/1943 | Miller | 179/1 VL |
| 3,126,449 | 3/1964 | Shirman | 179/1 P |
| 3,293,364 | 12/1966 | Richter | 179/1 D |
| 2,141,426 | 12/1938 | Weathers | 325/399 |
| 2,606,969 | 8/1952 | Scott | 333/18 T |
| 3,217,266 | 11/1955 | Pintell | 330/118 X |
| 3,281,723 | 10/1966 | Mercer | 179/1 VC |
| 3,497,621 | 2/1970 | Erath | 179/1 D |

*Primary Examiner*—Benedict V. Safourek
*Attorney, Agent, or Firm*—Hill, Sherman, Meroni, Gross & Simpson

[57] ABSTRACT

A device for reducing the apparent loudness of the output signal in a broadcasting system which includes a frequency selective gain reduction network connected between an automatic gain control amplifier and the output section. Means are provided for amplifying the energy content at the output of the automatic gain control amplifier. Pre-emphasis means are provided to increase the signal level of the sampling means within a given frequency range. The output of the sampling means is then used to actuate the frequency selective gain network for decreasing the gain at the output section in response to increases in gain at the output of the sampling means.

5 Claims, 4 Drawing Figures

INVENTOR.
Wallace J. Kabrick

BY Hill, Sherman, Meroni, Gross & Simpson ATTORNEYS

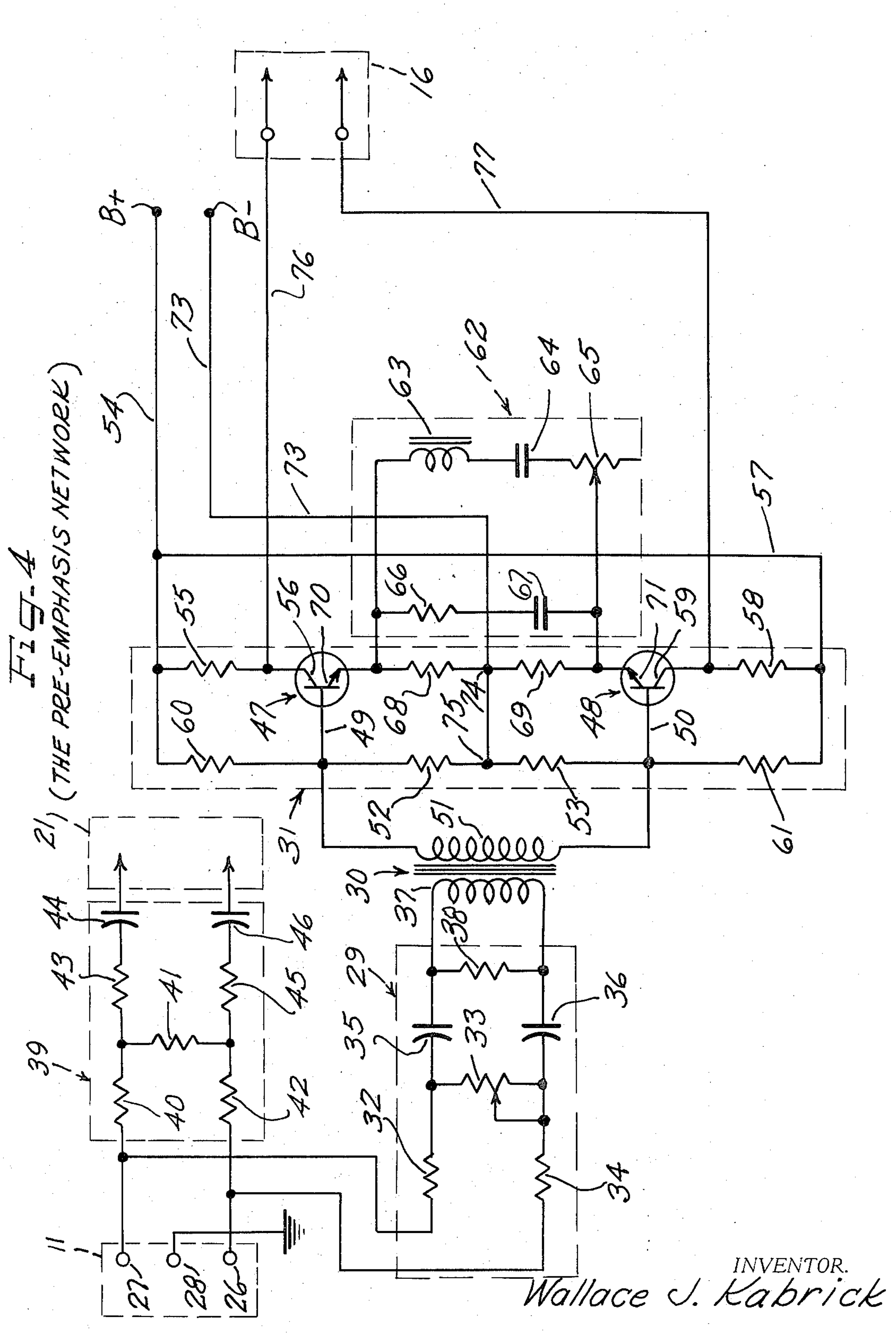
Fig. 4 (THE PRE-EMPHASIS NETWORK)
INVENTOR.
Wallace J. Kabrick
BY Hill, Sherman, Meroni, Gross & Simpson
ATTORNEYS

LOUDNESS CONTROL

This application is a continuation of Ser. No. 675,659, filed Oct. 16, 1967 and now abandoned.

This invention relates to a loudness control device for radio frequency broadcasting and allied equipment and in particular relates to a frequency selective gain control system for reducing the apparent or subjective loudness of a processed and/or broadcasted audio signal.

Nevertheless, it is common experience that radio and television commercials appear to be overbearing in contrast with the normal program listening levels. For instance, in the home or hospital or in any other listening area where it is highly desirable to control the volume of a television or radio receiver, the commercial interruption of a quietly adjusted program invariably appears to be unusually loud and to have a penetrating capacity tending to generate a disturbance which was not present during the non-commercial program time. This effect is created even under the operation of an automatic gain control amplifier system, and in fact, if the energy level of the broadcasted signal were to be measured quantitatively, it would probably be found that a relatively constant energy level existed for both the non-commercial and commercial programs.

Therefore, the actual or measured energy level of the broadcasted audio signal is not solely responsible for the disturbing effect of commercial program sounds, rather the apparent loudness of such commercial programs is a subjective loudness effect which is a characteristic of the listener. It has been well known that the ability of persons to hear sounds of a given energy level is dependent upon the frequency at which those sounds occur. Persons with very acute hearing have an audible frequency range from about 16 to 22,000 Hz, i.e., cycles per second. However, the sensitivity of such persons to hear a uniform energy sound varies considerably from the low frequency level of 16 Hz to the high level of 22,000 Hz. It has been found that the region of maximum acuteness occurs somewhere between 2,000 and 4,000 Hz with the ability of the individual to hear sounds tapering off sharply at the extreme limits of the audible frequency range.

In a normal listening experience, the signal energy will be distributed across the entire audible frequency range with the result that a pleasing signal is generated at the output of the automatic gain control amplifier. However, the extreme sensitivity of the listener to sounds within the 2–4 kHz region has been capitalized upon by advertising companies desiring to impress their message on the listening public. Once the extreme sensitivity of the listener to a specified limited frequency range is comprehended, it is readily possible for such companies to circumvent the function of the automatic gain control amplifier by maintaining an audio information signal which is acceptable to the automatic gain control amplifier but has much of the audio energy concentrated within the sensitive 2–4 kHz frequency range.

The technique of concentrating much of the program information in the 2–4 kHz frequency range has been mastered by advertisers such that it is a common experience to the listening public to expect the advertising portions of a program to be unpleasantly harsh and undesirable. The result is that listeners attempt to compensate for the apparent loudness of commercial programs by turning down the volume control of their TV receivers, for instance. Turning down the volume control on the receiving equipment, however, has the undesirable effect of reducing the energy level of the audio signal along the entire frequency range with the result that much of the program information may be lost. It may be noted that the concentration of energy in the 2–4 kHz frequency range is not only limited to deliberately planned advertising programs but also occurs inadvertently in theatrical productions as well. The general result is that the listener, in order to prevent occasional sounds in the 2–4 kHz region, must maintain the volume of the television or radio receiver at an undesirably low level.

Accordingly, it is a principal object of this invention to provide a device for reducing the apparent loudness of an audio program signal.

It is also an object of this invention to provide a loudness control device for reducing the gain of an audio program signal within a specified frequency region without affecting the gain of the program signal outside the designated frequency region.

It is another object of this invention to provide a loudness control device for sampling an audio program signal and for reducing the gain of the program signal in a specified frequency region only when high level energy is present in the critical frequency area of the sampled signal.

It is a further object of this invention to provide a pre-emphasis network for monitoring the output of an automatic gain control amplifier and for generating a control signal which directly reflects the level of energy concentration in a specified frequency region and which utilizes that signal to reduce the gain of the program signal in the specified frequency range.

It is also an object of this invention to provide a method for reducing the subjective loudness present at the output of an automatic gain control amplifier without creating change in low-level audio information signals.

It is a further object of this invention to provide a pre-emphasis network which is most sensitive to the loudness of a program information signal in the principal region in which a listener is most sensitive to the intensity of an audio information wave.

These and other objects, features and advantages of the present invention will be understood in greater detail from the following description and the associated drawings wherein reference numerals are utilized in designating an illustrative embodiment and wherein.

Figure 1:
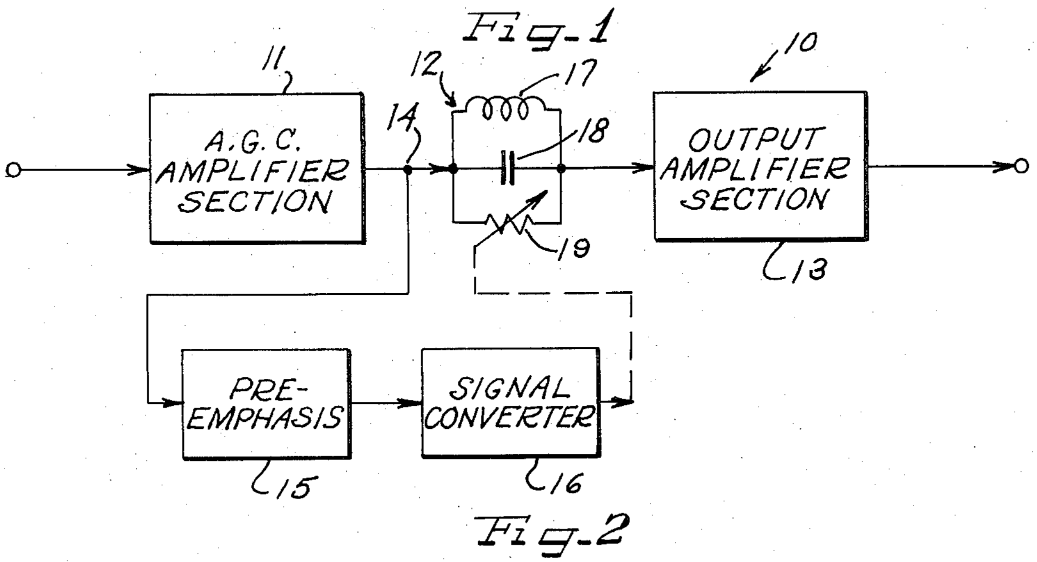
FIG. 1 is a block diagram of a loudness control device of this invention showing the cooperation of a pre-emphasis network, a signal converter, and a specialized gain reduction network.
Figure 3:
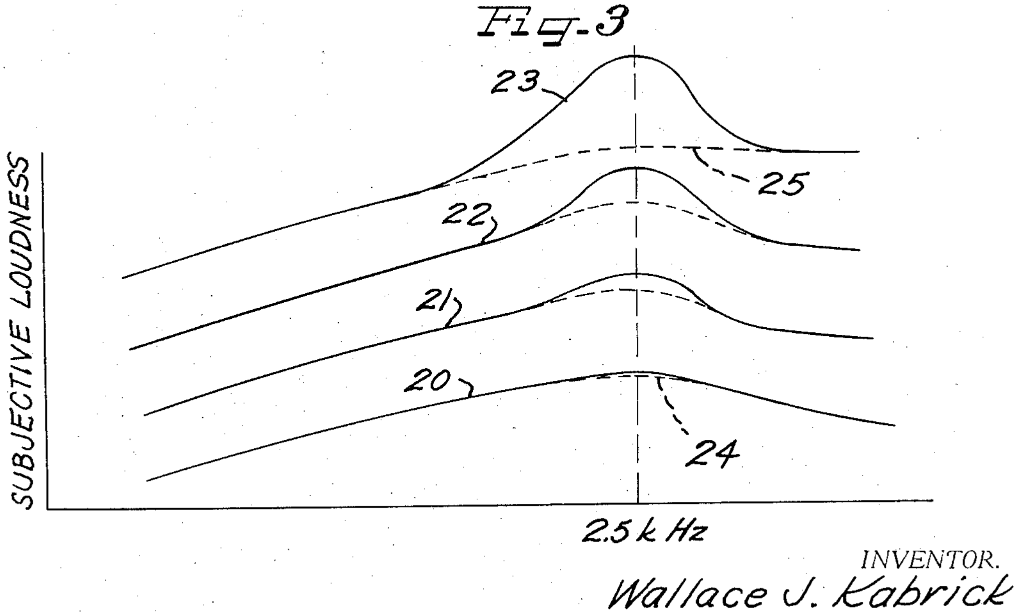

FIG. 3 is a graph of the apparent or subjective loudness of an audio program signal for varying energy levels and is also an illustration of the subjective loudness reduction accomplished through the use of loudness control device shown in FIG. 1, and FIG. 4 is a schematic diagram of a pre-emphasis network for sensing the energy content of the program information signal and for generating a control signal in response to specific energy levels within the selected frequency range.

In general, this invention provides a means for sampling the output of an automatic gain control amplifier and for determining the energy content of that output signal which is concentrated within a specified frequency range. If sufficient energy exists within the specified frequency range, then means are employed to reduce the gain of the program signal in that frequency range. If, for instance, an advertiser concentrates the advertisement speech and music in the 2–4 kHz frequency range, the high level energy in this range will be detected by the pre-emphasis network and will generate a signal to dynamically reduce the gain of the program signal in the 2–4 kHz range. This means that even if the energy level within the 2–4 kHz range is of a sufficiently low level to be passed by the automatic gain control amplifier, that energy level will be further reduced in order to defeat the attempt to take advantage of the subjective sensitivity of the listener in the indicated frequency region. In contrast, however, if the preemphasis network detects only nominal amounts of energy in the frequency sensitive region, the signal generated thereby will be inadequate to affect gain reduction in the sensitive region in the program signal. Accordingly, low level program signals will be passed substantially unchanged from the automatic gain control amplifier to the broadcasting sections.

Referring to the drawings in greater detail, the loudness control device 10 shown in FIG. 1 includes an automatic gain control amplifier section 11 which is connected through a specialized gain reduction network 12 to an output amplifier section 13. The program information signal is sampled at a point 14 intermediate the automatic gain control amplifier 11 and the specialized gain reduction network 12. The sampled program signal is fed through a pre-emphasis network 15 where the energy level of the sampled program signal is monitored within the sensitive audio frequency range and wherein a control signal is developed which reflects the level of energy present in that frequency range.

The control signal which is developed at the output of the pre-emphasis section 15 will be unsubstantial for low level energy present in the sensitive frequency area but will be substantial for high level energy detected by the preemphasis network. If a high level signal is generated in the preemphasis network a signal converter 16, which may take the form of a motor and transmission or the like, will utilize the signal to adjust the gain of the program signal reaching the output amplifier section 13. The converter 16 may also take the form of a lamp actuated photocell, a device using the variable resistance of a diode or any of a number of other well known devices which do not require an electromechanical conversion and response.

The gain reduction of the program signal which is accomplished in response to changes in the magnitude of the control signal at the pre-emphasis section 15 is restricted to the frequency region which is most sensitive to the average listener. This selective gain reduction is accomplished through the network 12 which consists of a parallel combination of an inductor 17, a capacitor 18 and a variable resistor 19. The capacitors 17 and 18 comprise a resonant network which is tuned substantially centrally within the sensitive frequency response region. In the absence of the resistor 19, therefore, the parallel LC network 17 and 18 would present a substantially high impedance between the automatic gain control amplifier and the output amplifier. However, if the variable resistor 19 is reduced to a substantially zero resistance, the tuned circuit 17–18 is effectively short circuited, and zero gain reduction would exist from the automatic gain control amplifier to the output amplifier section. In contrast, however, if the variable resistor 19 is adjusted to a substantially infinite value, the resistive branch of the LC network is effectively open circuited, and the full impedance of the tuned circuit is presented between the automatic gain control amplifier and the output amplifier section for reducing the gain of the program signal within the tuned frequency region. It should be understood that while the tuned frequency region is herein referred to as the 2–4 kHz region, that the tuned region may extend over a substantially greater frequency range. The reference to the 2–4 kHz region is merely a reference to the central tuning range or to the range of maximum audio sensitivity. In addition, it should be understood that the variable resistor 19 could be a potentiometer or a photocell or a semiconductor switching device, and the term resistance as used herein is intended to include both zero resistance and infinite resistance as would be experienced in the use of a switching mechanism.

The specialized gain reduction network 12 which is disposed intermediate the automatic gain control amplifier 11 and the output amplifier 10 has an impedance characteristic which is highly dependent upon the frequency of the signal applied thereacross and which is also dependent upon the magnitude of the variable resistor R. This impedance function is shown generally in FIG. 2 by a series of curves designated as R–1, R–2, R–3, R–4 and R–5. These curves indicate that the parallel LCR combination has a maximum impedance in the vicinity of 2.5 kHz with the impedance tapering off sharply at frequencies below and above the tuned frequency. Accordingly, the gain reduction of the program signal will be greatest in the tuned region as is well understood.

When the pre-emphasis network 15 detects the presence of high energy levels in the 2.5 kHz frequency region, the signal converter will adjust the variable resistor 19 to an appreciable value such that the parallel LCR combination has a net impedance as shown at the curve R–5. However, for lower levels of energy present in the 2.5 kHz frequency region, the signal converter will adjust the variable resistor 19 to have a low resistance and thereby effectively short circuit the high impedance of the LC parallel combination 17–18. The result is that the gain between the automatic gain control amplifier and the output amplifier will be substantially flat as shown at R–1.

Figure 2:
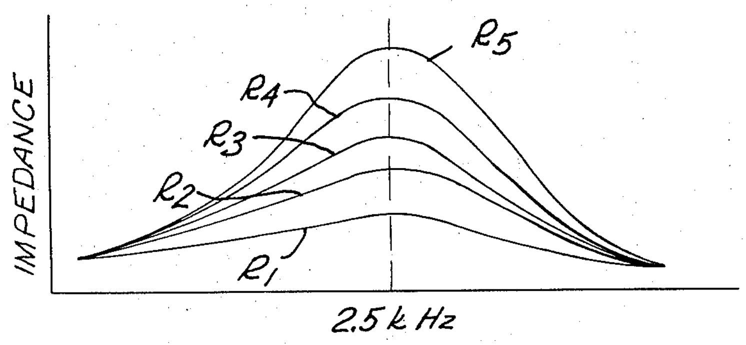
FIG. 2 is a graph of the output response of the gain reduction network for varying input control signals.

From a study of FIG. 2 in conjunction with FIG. 1, therefore, it will be noted that first, the gain reduction which is accomplished is limited to the specific frequency region which is centered about the tuned frequency of the LC parallel combination 17–18. And second, that little or no gain reduction is accomplished until the energy level within the audio sensitive region reaches a sufficiently high level to appreciably increase the resistance of the resistor 19. The advantages of these two characteristics can be seen in FIG. 3.

In FIG. 3 a number of curves 20, 21, 22 and 23 illustrate graphically the subjective loudness characteristic of the average listener. Each of the curves 20 through 23 may represent a uniform measured energy level with the variations in the curve being reflective of the sensitivity of the inner ear. For instance, at the curve 23, the measured loudness across the entire frequency range may be substantially uniform. However, it is apparent that the subjective loudness as experienced by a listener is substantially peaked in the 2.5 kHz region. This is the region in which advertisers desire to concentrate their advertising information, as they can acquire a loudness advantage over their listeners which cannot be otherwise achieved due to the presence of the automatic gain control amplifier. Accordingly, the 2.5 kHz region is the frequency range in which means must be provided to detect the presence of large energy levels and to reduce the gain of the program signal accordingly.

It is apparent from FIG. 3 that it would be undesirable to effect a substantial gain reduction in the frequency sensitive region for all values of energy present in that region. For instance, in an average theatrical production the amount of energy present in the 2.5 kHz region may be nominal, and a large reduction in gain in that region would accordingly result in undesirable change of the program signal. However, when a large level of energy is found to be present in the 2.5 kHz region, it is desirable at that time to reduce the gain of the program signal in the sensitive region only. As shown in FIG. 3, these requirements are accomplished through the use of the loudness control device shown in FIG. 1. In particular, for low energy level signals such as the signal represented by the curve 20, the variable resistor 19 may have the value R–1 as shown in FIG. 2 such that little or no gain reduction is accomplished as indicated by the substantial coincidence of the dotted and solid lines at 24 in FIG. 3. In contrast, when large energy levels are present, such as is indicated by the curve 23 in FIG. 3, the pre-emphasis network 15 will generate a large signal for altering the variable resistor 19 to a value such as the value R–5 of FIG. 2. The result is that a gain reduction of the program signal is accomplished which reduces the subjective loudness of the audio wave from the solid line 23 to the dotted line 25 in FIG. 3. Through this device, therefore, an attempt to concentrate a program signal in the sensitive frequency range will be effectively defeated without generating distortion for signals having nominal energy levels in the sensitive frequency range.

An illustrative embodiment of the pre-emphasis network 15 is shown in FIG. 4 as comprising a push-pull amplifier which has a frequency selective or wave-shaping circuit in the load thereof and which accordingly generates a control signal which reflects the energy level present in the sensitive frequency range. In particular, the pre-emphasis network 15 is connected to the automatic gain control amplifier at 26 and 27, there being a circuit ground or common terminal provided at 28. It has been found desirable to reduce substantially the gain for low frequency signals prior to the input of the push-pull amplifier, and accordingly a low frequency gain reduction network 29 is connected prior to the input transformer 30 of the push-pull amplifier 31. The gain reduction network comprises a resistive circuit path including the resistors 32, 33 and 34. Capacitors 35 and 36 provide a low impedance path for the high frequency signals fed to the primary winding 37 of the transformer 30. The primary 37 is provided with a shunt connected resistor 38 and establishes thereby a resistive loading for the network 29.

Essentially, the network 29 reduces the gain of the program signal in the frequency range below 1 kHz to assure more efficient use of the wave-shaping circuitry associated with the push-pull amplifier 31. It will be noted that the program signal is not only fed through the circuit 29 to the transformer 30, but the signal is also fed through a resistive network 39 to the selective gain reduction circuit 12. The network 39 which includes the resistive path 40, 41 and 42 and the resistor-capacitor combinations 43–44 and 45–46 serves to compensate for a rise created in the flat amplifier through the use of the gain reduction network 29. Essentially, the network 39 is a balancing network which assures that the output of the automatic gain control amplifier will remain substantially flat.

The push-pull amplifier 31 comprises first and second transistors 47 and 48 which have base connections 49 and 50 connected across the secondary winding 51 of the input transformer 30. As in the case of the primary winding 37, the secondary winding 51 is terminated with series resistances 52 and 53. The resistors 52 and 53 form part of the base biasing network comprised of resistors 52 and 60 for the transistor 47 and 53 and 61 for the transistor 48.

The energy source for the push-pull amplifier 31 is connected through a line 54 to a resistor 55 and therefrom to the collector 56 of the transistor 47. Likewise, the energy supply line 54 is connected through a second supply line 57 to a resistor 58 which, in turn, is connected directly to the collector 59 of the second transistor 48.

The frequency selection characteristic of the preemphasis amplifier 15 is accomplished through a load 62 which consists in part of two parallel connected branches. The first branch comprises an inductor 63, a capacitor 64, and a variable resistor 65. The capacitor and inductor are tuned to the frequency selection region, namely, to the 2–4 kHz frequency area and accordingly develop a substantially reduced impedance for amplified energy in the tuned frequency area. The second parallel branch comprises a resistor 66 and a second capacitor 67. This parallel combination alters slightly the characteristic of the resonant loading network of the push-pull amplifier by assuring that a generally higher gain will result at frequencies above the resonant area than at frequencies below the resonant area. For instance, the pre-emphasis amplifier will have a higher gain in the 10 kHz region than will be found in the 1 kHz region. This assures that the gain reduction curve will be more closely matched to the subjective loudness characteristic as shown in FIG. 3. Additional emitter resistors 68 and 69 are connected from the emitters 70 and 71, respectively to the ground line 73 at the point 74. The resistors 68 and 69 furnish a DC path for the collector current from the B– return of the power supply to the B+ supply. Also, the point 74 is connected to the point 75 for providing a conducting path between the base and emitter terminals of the transistors 47 and 48. The output of the pre-emphasis network is connected across the collectors of the respective transistors through output lines 76 and 77. The output lines 76 and 77 are then connected to the signal converter 16 for developing a control signal to dynamically alter the resistance of the variable resistor 19.

Essentially, when energy is present in the frequency range to which the resonant circuit 62 is tuned, the impedance presented by that branch to that frequency will be less, and a higher voltage will result at the output lines 76 and 77. This control signal is then used, as explained, to control the resistance of the variable resistor 19. However, if little energy is present in the sensitive frequency range, a control signal will not be generated at the output lines 76 and 77. Accordingly, gain reduction is accomplished only for high level program signals and only for program signals existing in the frequency sensitive 2–4 kHz range.

It will be understood that various modifications and combinations of the features described herein may be accomplished by those versed in the art, but I desire to claim all such modifications and combinations as properly come within the scope and spirit of my invention.

I claim as my invention:

1. In a broadcast transmitter including an automatic gain control amplifier through which the audio frequency intelligence signal passes and which controls the signal level as a function of the total energy in the audio frequency spectrum, comprising an attenuating network receiving the output of said automatic gain control network to pass the audio to an output and having a variable impedance for audio frequencies in a small portion of the audio band and low impedance for audio frequencies other than said small portion of the audio band, a detecting and control means connected to said attenuating network to vary its impedance as a function of energy content of the audio signal in said small portion of the audio band, said detecting and control means connected to the output of said automatic gain control amplifier and detecting the energy level of the audio signal in said small portion of the audio band, and said detecting and control means connected to said variable attenuating network so as to adjust its impedance to signals in said small portion of the audio band without substantially affecting audio signals outside said small portion of the audio bands so as to prevent unusually high levels of energy in said small portion of the audio band from passing to said output.

2. In a broadcast transmitter according to claim 1 wherein said small portion of the audio band extends from 2–4 kilohertz.

3. In a broadcast receiver according to claim 1 wherein said attenuating network comprises a capacitor, an inductance and a variable resistance connected in parallel and said detecting and control means connected to said variable resistance to vary the impedance of said network to said small portion of the audio frequency band and said capacitor and inductance having values such that they are resonant in said small portion of the audio frequency band.

4. In a broadcast transmitter according to claim 3 wherein said capacitor and inductance have values such that they are resonant between 2–4 kilohertz.

5. In a broadcast transmitter according to claim 4 wherein said detecting control means comprises a push-pull amplifier including first and second transistors connected in push-pull and receiving the output signal from said automatic gain control network on their base electrodes, a second capacitor and a second inductance connected in series between the emitters of said first and second transistors and having values so as to have a series resonance within said small portion of said audio band, and adjustment means connected to the collectors of said first and second transistors and controlling said variable resistance of said attenuating network.

* * * * *